United States Patent [19]

Dombro et al.

[11] Patent Number: 4,791,089
[45] Date of Patent: Dec. 13, 1988

[54] ZIRCONIA-TITANIA-SILICA TERGELS AND THEIR USE AS CATALYST SUPPORTS

[75] Inventors: Robert A. Dombro, Palatine, Ill.; William Kirch, Clinton, Iowa

[73] Assignee: Enron Chemical Corporation, Cincinnati, Ohio

[21] Appl. No.: 928,586

[22] Filed: Nov. 12, 1986

Related U.S. Application Data

[63] Continuation of Ser. No. 858,076, Apr. 25, 1986, abandoned, which is a continuation of Ser. No. 755,927, Jul. 17, 1985, abandoned, which is a continuation-in-part of Ser. No. 540,004, Oct. 7, 1983, abandoned.

[51] Int. Cl.$^4$ .................... B01J 21/06; B01J 20/10
[52] U.S. Cl. ..................................... 502/236; 502/239
[58] Field of Search ............................. 502/236, 239

[56] References Cited

U.S. PATENT DOCUMENTS

| | | | |
|---|---|---|---|
| 2,562,888 | 8/1951 | Bond, Jr. | 502/235 |
| 2,580,641 | 1/1952 | Bates et al. | 502/60 |
| 2,697,066 | 12/1954 | Sieg | 502/235 |
| 2,825,721 | 3/1958 | Hogan et al. | 260/88.2 R |
| 3,159,569 | 12/1964 | Hansford | 502/216 |
| 3,159,588 | 12/1964 | Hansford | 502/236 |
| 3,862,104 | 1/1975 | Witt | 502/237 |
| 3,879,362 | 4/1975 | Chalfont et al. | 260/88.2 R |
| 3,887,494 | 6/1975 | Dietz | 502/236 |
| 3,950,316 | 4/1976 | Witt | 502/239 |
| 4,053,436 | 10/1977 | Hogan et al. | 502/236 |
| 4,107,088 | 8/1978 | Elliott, Jr. | 502/65 |
| 4,119,569 | 10/1978 | Dietz | 502/236 |
| 4,128,500 | 12/1978 | Hwang et al. | 502/171 |
| 4,169,926 | 10/1979 | McDaniel | 502/212 |
| 4,221,768 | 9/1980 | Inoue et al. | 502/202 |
| 4,246,137 | 1/1981 | Dombro et al. | 502/216 |
| 4,279,780 | 7/1981 | Dombro | 502/236 |

FOREIGN PATENT DOCUMENTS 19642 12/1980 European Pat. Off. .

*Primary Examiner*—Carl F. Dees
*Attorney, Agent, or Firm*—Marshall, O'Toole, Gerstein, Murray & Bicknell

[57] ABSTRACT

A method of preparing a high pore volume, high surface area zirconia-titania-silica tergel useful as an olefin polymerization or copolymerization catalyst support comprises the steps of coprecipitating hydrous zirconia, hydrous titania and hydrous silica, aging and washing the resulting hydrotergel, removing water from the washed hydrotergel and optionally calcining the resulting xerotergel. Resins with predetermined properties such as high melt index, broad molecular weight distribution, high weight swell, etc. can be produced from catalysts of the chromium or Ziegler type based on these supports.

54 Claims, No Drawings

ZIRCONIA-TITANIA-SILICA TERGELS AND THEIR USE AS CATALYST SUPPORTS

CROSS-REFERENCE TO RELATED APPLICATION

This is a continuation of copending, commonly assigned application Ser. No. 858,076 filed Apr. 25, 1986 (now abandoned), which is a continuation of copending, commonly assigned application Ser. No. 755,927 filed July 17, 1985 (now abandoned), which is a continuation-in-part of copending, commonly assigned application Ser. No. 540,004 filed Oct. 7, 1983 now abandoned.

BACKGROUND OF THE INVENTION

1. Field of the Invention

This invention relates generally to the field of catalyst supports and, more particularly, this invention relates to zirconia-titania-silica tergels useful as supports for olefin polymerization catalysts.

2. Description of the Prior Art

The use of xerogels as catalyst supports is well known. Low pore volume, high surface area ceramic-type supports, while suitable for use in hydrocarbon cracking catalysts, are unsuitable for use in olefin polymerization catalysts, as the activities of such catalysts in polymerization processes are very low.

One form of xerogel which is useful as a polymerization catalyst support is the medium pore volume silica xerogel. Often, the silica xerogel is a two-component gel comprising zirconia or titania incorporated (in minor proportion) in silica.

One type of silica-zirconia xerogel is produced by depositing zirconia on a silica gel. The deposition of zirconia on a silica gel does not provide a support which, when used in a polymerization catalyst, produces polyethylene resins with high melt indexes.

Dombro et al U.S. Pat. No. 4,246,137 (Jan. 20, 1981), the disclosure of which is hereby incorporated by reference, describes a method of preparing high pore volume zirconia-silica catalyst supports by coprecipitation, washing and water removal.

Tergels may also be used as polymerization catalyst supports. Hogan et al U.S. Pat. No. 2,825,721 describes a variety of tergels and their use as polymerization catalyst supports.

It is desirable to produce polyolefin resins which have predetermined properties such as high melt index, broad molecular weight distribution, high weight swell, etc., and attempts have been made to produce such resins using catalysts supported on cogels. For example, Hwang et al U.S. Pat. No. 4,128,500 describes a supported chromium (III) acetylacetonate type catalyst. However, prior catalysts supported on cogels and tergels have not been completely successful in providing control of product polymer characteristics.

SUMMARY OF THE INVENTION

It is an object of the present invention to overcome one or more of the problems described above.

In accordance with the invention, a high pore volume, high surface area zirconia-titania-silica tergel useful as a catalyst support for an olefin polymerization and copolymerization catalyst is provided. The invention contemplates, without limitation, the method of making the tergel, the tergel itself, catalyst supports and catalysts based upon the tergel, and a method of polymerizing using the catalysts.

More specifically, the present invention contemplates a reaction wherein hydrous zirconia, hydrous titania, and hydrous silica are coprecipitated in aqueous solution. Alkali metal or ammonium salts of zirconium oxalate and titanium oxalate are used as the source of zirconia and titania, respectively. Coprecipitation with silica is acid promoted, and the source of silica is preferably an alkali metal silicate. Such coprecipitation results in intimate and well-distributed incorporation of zirconia and titania in silica.

The hydrotergel so produced is then aged and washed to produce a high pore volume (i.e., about 1.5 cc/g or greater) hydrotergel. Water removal from the washed hydrotergel is accomplished by any of a variety of methods, such as those disclosed in Dombro et al U.S. Pat. No. 4,246,137 and Dombro U.S. Pat. No. 4,279,780, the disclosures of which are incorporated herein by reference, or by spray-drying, freeze drying or other suitable techniques.

The water removal technique is selected for its ability to gently remove water from the hydrotergel to avoid substantial collapse of the pores of the hydrotergel, thereby providing a xerotergel having a desirably high pore volume of at least about 1.5 cc/g.

The resulting xerotergel can be used as is or may be calcined prior to use as an olefin polymerization catalyst support.

Zirconium oxalate compounds, when coprecipitated in a hydrogel, provide advantages as catalyst supports for polymerization, as the zirconium preserves the pore structure of the calcined xerogel and results in product resins with relatively high melt indexes (i.e. relatively low molecular weights).

The xerotergel of the invention has a high pore volume, generally in the range of about 1.5 to 3.5 cc/g ($N_2$-BET) and a high surface area (e.g. about 200 to about 600 $m^2/g$). The actual physical properties obtained are determined in part by the method used to remove water from the hydrotergel. The concentration of zirconia ($ZrO_2$) and of titania ($TiO_2$) with respect to silica may be equal or different and are generally in the range of about 0.1 wt % to about 67.5 wt %, but are preferably between about 0.2 and 5 wt % of each metal oxide. Most preferably, when the tergel is used to support a chromium catalyst, the sum of the zirconia and titania concentrations with respect to silica is about 5 wt. % or less.

Further objects and advantages of the invention will be apparent to those skilled in the art from the following detailed description taken in conjunction with the appended claims.

DETAILED DESCRIPTION OF THE INVENTION

The present invention contemplates the preparation of high pore volume, high surface area zirconia-titania-silica tergels by acid promoted coprecipitation of zirconia and titania with silica, preferably in minor proportion to silica. As a result, zirconia and titania are well distributed and integrated into the bulk of silica.

As detailed below, the use of an alkali metal or ammonium salt of zirconium oxalate (e.g., ammonium tetraoxalatozirconate (IV) pentahydrate) and titanium oxalate (e.g., ammonium bis(oxalato)oxotitanate (IV) monohydrate) as the source of zirconia and titania, respectively, during their acid-promoted coprecipitation with silica from an alkali metal silicate leads to the intimate and well distributed incorporation of zirconia and titania, preferably in minor proportion, into silica. Coupled with special water removal techniques, also detailed below, as well as other suitable water removal methods, the procedure provides novel porous xerotergel catalyst supports having high pore volume and high surface area.

Hydrotergel Preparation

Preparation of high pore volume zirconia-titania-silica tergels is effected by the coprecipitation of hydrous zirconia, hydrous titania, and hydrous silica.

A zirconium compound of the type:

$$M_4Zr(C_2O_4)_4 \cdot nH_2O$$

and a titanium compound of the type:

$$M_2TiO(C_2O_4)_2 \cdot nH_2O$$

where M is an alkali metal or ammonium ion and n equals 0 to 10, are reacted with a silicon compound of the type:

$$A_2SiO_3$$

where A is an alkali metal ion, in aqueous solution, preferably at a pH of less than about 9.

It is desirable that the zirconium compound, the titanium compound and the alkali metal silicate be together in solution prior to precipitation. The zirconium compound may be added to the aqueous silicate solution before, after or together with the titanium compound. The pH of this solution determines whether premature precipitation takes place. Where ammonium salts of titanium oxalate and zirconium oxalate are used, it has been found that the pH of the solution must be equal to or greater than about 11 so as to avoid premature precipitation.

The minimum required pH level may vary to some degree if other titanium or zirconium salts are used, but the minimum pH is readily empirically determinable in any case.

The coprecipitation reaction is acid-promoted. Therefore, the reaction may be initiated by addition to the solution of an acidic material (e.g. a mineral acid) to lower the solution's pH, preferably to less than about 9. Preferred acidic materials include sulfuric acid, hydrochloric acid and ammonium sulfate.

The resulting coprecipitated hydrotergel contains silica, titania and zirconia, and has a desirably high pore volume of at least about 1.5 cc/g, preferably in the range of about 1.5–3.5 cc/g.

After coprecipitation, the hydrotergel (in aqueous suspension) is aged, preferably at a temperature between about ambient and 100° C., for at least one hour at a maintained pH of less than about 9, preferably at a pH of about 6.

The aged hydrotergel is then separated from the bulk of the water and washed to remove soluble alkali metal and ammonium salt by-products. Preferably, the aged hydrotergel is first washed with water, then with aqueous ammonium nitrate and again with water. However, it may be washed with water alone, or with any other aqueous liquid in which the by-products are soluble.

Removal of the by-products by washing is essential in order to avoid the formation of silicates, such as sodium silicates, for example, during subsequent calcining.

The presence of such silicates in a polymerization catalyst support is highly undesirable, as they tend to be quite weak, and their presence can lead to the collapse of pores in the tergel.

The alkali metal and ammonium concentration in the final wash liquid should be less than or equal to about 20 parts per million. After washing, a hydrotergel cake remains which contains about 90% water.

Water Removal

Water is gently removed from the washed hydrotergel cake by a method selected to avoid substantial collapse of the pores of the hydrotergel in order to produce the high pore volume xerotergel of the invention. Water removal can be accomplished by any of a variety of methods. For example, water may be removed by azeotropic distillation with a compound capable of forming an azeotrope with water, such as ethyl acetate.

In a second method, water is extracted from the hydrotergel with a water-miscible solvent or mixture of solvents, such as a low molecular weight ketone or a mixture of a ketone and a low molecular weight alcohol.

A third method entails extracting the hydrotergel with a water-miscible solvent or mixture of solvents to remove about 90–95% of the water and then treating the partially dehydrated tergel with a ketal of the formula, $RC(OR)_2R$, in which R is the same or different and is an alkyl group of 1–5 carbon atoms, plus a trace of acid, whereby residual water is completely and irreversibly removed by a chemical reaction.

In a fourth method water is removed by contacting the hydrotergel directly with sufficient ketal in the presence of a trace of acid as catalyst.

Finally, water can be removed from the washed hydrotergel by spray-drying, freeze drying or by any other suitable method.

The xerotergel is thus freed of absorbed organic compounds. It can then be used as is or may be calcined, preferably at temperatures in the range of 400°–1850° F., prior to use as an olefin polymerization catalyst support, or for any other desired purpose. For example, the tergel may be used to immobilize enzymes for use in chemical and food production processes.

Selection of a water removal method which avoids substantial pore collapse is essential, as high pore volume (i.e., 1.5 cc/g or above) is required in polymerization catalyst supports if low molecular weight (i.e., high melt index) ethylene homopolymers and copolymers having broad molecular weight distributions (as measured by rheological dispersity, $R_D$) are to be obtained.

The water removal techniques of the invention gently remove water in order to retain pore integrity. This is accomplished by avoiding conditions during water removal wherein the surface tension of the water being removed becomes strong enough to collapse pores due to capillary action thereon.

Prior tergel preparation procedures involve water removal by calcining, for example, and result in relatively low pore volume tergels. For example, in Hansford U.S. Pat. No. 3,159,588, pore volumes in the range of about 0.3–0.5 cc/g are obtained. While such pore volumes may be suitable for cracking catalysts, they are much too low for use in polymerization catalyst supports.

Catalyst Supports

Ziegler and chromium type olefin polymerization catalysts are among those which may be supported on the tergels of the invention. Selection of components depends on what resin properties are desired. Generally, catalysts are made by depositing a catalytically active material, such as a transition metal or chromium compound, on the tergel support, as by means well known in the art, for example.

As an example, a chromium (III) or chromium (VI) compound may be used as the active polymerization ingredient. The chromium compound may be dry blended with or impregnated as a solution onto the xerotergel in a non-aqueous solvent, followed by removal of the solvent. Activation takes place by heating in a fluid bed with dry gases such as air, nitrogen followed by air, nitrogen then air followed by carbon monoxide, etc. Activation temperatures up to 1750° F. are preferred.

Chromium (III) acetylacetonate is a preferred chromium source since water is not reintroduced when it is dry blended with the xerotergel prior to thermal activation to produce the catalyst.

In order to avoid sintering at high activation temperatures, especially in the case of chromium catalysts, it is preferred that the respective concentrations of zirconia and titania, with respect to silica, be no more than about 3 wt. % each, with the sum of the zirconia and titania concentrations being no more than about 5 wt. %.

The following Examples will serve to illustrate the practice of the invention, but unnecessary limitations should not be inferred therefrom.

EXAMPLES

Tergel Preparation

Example A (Invention)

A solution of 7.6 g ammonium tetraoxalatozirconate (IV) pentahydrate in 200 cc of deionized water (pH 4.3) was added with agitation to a solution of 400 g sodium silicate (6.75 wt % $Na_2O$, 25.3 wt % $SiO_2$; wt. ratio $SiO_2/Na_2O = 3.75$) in 800 cc of deionized water (pH 11.3) over a period of ten minutes. Ammonia was liberated. To this solution, initially at a pH of 11.2, was added a solution of 7 g ammonium bis(oxalato)oxotitanate (IV) monohydrate in 200 cc of deionized water over a period of twenty minutes. The final pH was 11.1.

Coprecipitation occurred when a solution of 12 wt % sulfuric acid was added until a final pH of 6 was reached. The coprecipitated hydrotergel was aged for six hours at about 90° C. while the pH was maintained at 6 with additional 12 wt. % sulfuric acid. Following aging, the hydrotergel was collected by filtration and washed first with deionized water, then with a 1% aqueous solution of ammonium nitrate, and finally with deionized water until the sodium ion concentration was about 20 ppm in the final wash. Bulk water was removed by suction filtration to give a hydrotergel cake containing about 90 wt. % water.

A portion of the hydrotergel cake was dehydrated by azeotropic distillation with ethyl acetate to give a xerotergel containing 1.1 wt. % zirconia, 1.0 wt. % titania and about 97.9 wt. % silica. The xerotergel had a bulk density of 0.13 g/cc, an $N_2$ pore volume of 2.49 cc/g and a surface area of 484 $m^2/g$.

Example B (Invention)

A 375 g portion of the hydrotergel cake of Example A was dehydrated by mixing with 1200 cc of acetone, allowing the hydrotergel to settle by gravity and decanting the clear upper acetone-water layer. This cycle was repeated four more times with 600 cc of fresh acetone added each time following by removal of about 600 cc of the clear upper acetone-water layer. The acetone-hydrotergel slurry containing about 10 wt. % residual water was collected by suction filtration and then mixed with 220 cc of 2,2-dimethoxypropane plus 1 cc of 10% hydrochloric acid. After thorough mixing all volatiles were removed with mild heat under a $N_2$ atmosphere. Final drying of the xerotergel was at 200° C. The xerotergel had a bulk density of 0.22 g/cc, an $N_2$ pore volume of 2.00 cc/g and a surface area of 431 $m^2/g$.

Example C (Invention)

A 375 g portion of the hydrotergel cake of Example A was dehydrated by mixing with sufficient acetone to form 1200 cc of slurry. After efficient agitation the slurry was allowed to settle by gravity. The clear upper acetone-water layer was separated by decantation. This process was repeated four more times. The acetone-hydrotergel slurry containing about 0.6 moles of residual water was treated with 220 cc (1.8 moles) of 2,2-dimethoxypropane plus 1 cc of 10% HCl. All organic compounds were then removed under $N_2$ and mild heat. The remaining xerotergel had a bulk density of 0.24 g/cc.

Example D (Invention)

A solution of 7.5 g ammonium tetraoxalatozirconate (IV) pentahydrate in 200 cc of deionized water (pH 4.3) was added with agitation to a solution of 400 g sodium silicate in 800 cc of deionized water (pH 11.6) over a period of twenty minutes. Ammonia was liberated. To this solution, initially at a pH of 11.6, was added a solution of 7.5 g potassium bis(oxalato)oxotitanate (IV) dihydrate in 200 cc of deionized water over a period of twenty-five minutes. The final pH was 10.8.

Coprecipitation occurred in about one hour when a solution of 12 wt. % sulfuric acid was added to a final pH of 6. The coprecipitated hydrotergel was aged for two hours at about 80° C. while the pH was maintained at 6 with additional 12% sulfuric acid. Following aging, the hydrotergel was collected and washed as described in Example A.

A portion of the hydrotergel cake was dehydrated by azeotropic distillation with ethyl acetate to give a xerotergel containing 1.4 wt. % zirconia, 1.1 wt. % titania and about 97.5 wt. % silica. The xerotergel had a bulk density of 0.13 g/cc, an $N_2$ pore volume of 2.41 cc/g and a surface area of 475 $m^2/g$.

Example E (Comparative)

A cogel containing zirconia with silica was prepared as described in U.S. Pat. No. 4,246,137, Example No. 8. The xerocogel contained 2.7 wt. % $ZrO_2$ and had an $N_2$ pore volume of 2.45 cc/g.

Example F
(Comparative)

This porous support was a commercial high pore volume silica with an $N_2$ pore volume of 2.05 cc/g and a surface area of 285 $m^2/g$.

Catalyst Preparation and Testing

Olefin polymerization catalysts based on the tergels of Examples A to D, the cogel of Example E, and the high pore volume commercial silica of Example F were prepared by dry mixing chromium (III) acetylacetonate with the calcined xerotergels, the cogel (1000° F.) and the silica. The tergel and cogel supported catalysts were activated in a fluidized bed with dry $N_2$ at 1700° F. followed by a 30 minute dry air treatment at 1300° F. The silica supported catalyst was activated at 1600° F. in a fluid bed with dry air. The concentration of chromium in the activated catalysts was about 1 wt. %.

Polymerization was conducted in a one gallon autoclave with isobutane as diluent, under 550 psi pressure at 225° F. and with ethylene fed on demand.

The data in the Table below show that the molecular weight distribution of polyethylene resin produced by chromium catalysts supported on the zirconia-titania-silica tergels of Examples A-D is much broader than resin produced from similar catalysts supported on a zirconia-silica cogel or on a high pore volume silica. This is expressed by higher $R_D$ values which measure resin rheological dispersity (polymerization Examples Nos. 1-4 versus Examples Nos. 5 and 6). Together with broad molecular weight distribution these resins also have high melt index (MI) and weight swell) ($S_w$) (Examples 2 and 3). Such resins produced by catalysts supported on the tergels of this invention find wide application.

| | Catalyst and Resin Evaluation | | | | |
|---|---|---|---|---|---|
| Polymerization Example No. | Catalyst Support Example No. | Catalyst Productivity (g/g Catalyst) | $R_d{}^a$ | $S_w{}^b$ | $MI^c$ |
| 1 (Invention) | A | 2173 | 8.0 | 4.6 | 0.9 |
| 2 (Invention) | B | 3893 | 7.7 | 4.8 | 2.4 |
| 3 (Invention) | C | 4079 | 7.2 | 4.8 | 2.0 |
| 4 (Invention) | D | 1329 | 6.9 | 5.6 | 4.8 |
| 5 (Comparative) | E | 1600 | 4.0 | 4.9 | 3.4 |
| 6 (Comparative) | F | 5200 | 5.0 | 5.1 | 0.8 |

[a] Shida, M. and Cancio, L., "Polymer Engineering and Science", Vol. II, p. 124-128, March, 1971.
[b] Cancio, L. and Joyner, R., "Modern Plastics", Jan., 1977.
[c] ASTM D-1238-62T Condition E, g/10 minutes. Milled and stabilized.

The foregoing detailed description is given for clearness of understanding only, and no unnecessary limitations should be inferred therefrom, as variations within the scope of the invention will be obvious to those skilled in the art.

We claim:

1. A method of preparing zirconia-titania-silica tergels comprising the steps of:
   (a) mixing a zirconium compound of the formula $M_4Zr(C_2O_4).nH_2O$ and a titanium compound of the formula $M_2TiO(C_2O_4)_2.nH_2O$, where M is an alkali metal or ammonium ion and n equals 0 to 10, with a silicon compound of the formula $A_2SiO_3$, where A is an alkali metal ion, in an aqueous solution at a pH sufficiently high to avoid precipitation of a tergel;
   (b) adding an acidic material to said solution to lower the pH thereof sufficiently to result in precipitation of a porous hydrotergel containing silica, titania and zirconia and having a pore volume of at least about 1.5 cc/g, said zirconium, titanium and silicon compounds of (a) being mixed in proportions selected to result in respective independent concentrations of said zirconia and titania of between about 0.1 wt. % and 5 wt. % with respect to said silica;
   (c) aging said hydrotergel of (b);
   (d) washing and said hydrotergel of (c) with an aqueous liquid; and
   (e) removing water from the washed hydrotergel of (d) by a method selected to avoid substantial collapse of the pores of said hydrotergel to produce a xerotergel having a pore volume of at least about 1.5 cc/g.

2. The method of claim 1 wherein M is an alkali metal ion.

3. The method of claim 1 wherein M is an ammonium ion.

4. The method of claim 3 wherein said solution pH of step (a) is at least about 11.

5. The method of claim 4 wherein said acidic material of step (b) is added in an amount sufficient to lower said pH to less than about 9.

6. The method of claim 1 wherein said acidic material is sulfuric acid, hydrochloric acid or ammonium sulfate.

7. The method of claim 1 wherein said aging is done at a temperature between about ambient to 100° C. for at least one hour.

8. The method of claim 1 wherein said pore volume is in the range of about 1.5-3.5 cc/g.

9. The method of claim 1 wherein the sum of said zirconia and titania concentrations is less than or equal to about 5 wt. % with respect to silica.

10. The method of claim 1 wherein said water is removed from the washed hydrotergel by azeotropic distillation with a compound capable of forming an azeotrope with water.

11. The method of claim 1 wherein said water is removed from the washed hydrotergel by washing the hydrotergel with a water miscible solvent or mixture of solvents.

12. The method of claim 11 wherein said solvent is a low molecular weight ketone or a mixture of a ketone and a low molecular weight alcohol.

13. The method of claim 1 wherein said water is removed from the washed hydrotergel by extracting the hydrotergel with a water miscible solvent or mixture of solvents to remove about 90-95% of the water and then treating the partially dehydrated tergel with a ketal of the formula $RC(OR)_2R$, in which R is the same or different and is an alkyl group of 1-5 carbon atoms, in the presence of a trace of acid, whereby residual water is completely and irreversibly removed.

14. The method of claim 1 wherein said water is removed from the washed hydrotergel by contacting the hydrotergel directly with a ketal of the formula $RC(OR)_2R$, where R is the same or different and is an alkyl group of 1-5 carbon atoms, in the presence of a trace of acid, in an amount sufficient to completely and irreversibly react with said water.

15. The method of claim 1 wherein said water is removed from the washed hydrotergel by spray-drying.

16. The method of claim 1 wherein said water is removed from the washed hydrotergel by freeze drying.

17. The method of claim 1 comprising the additional step of calcining said xerotergel of (e).

18. The method of claim 17 wherein said calcining is done at a temperature of about 400°–1850° F.

19. A zirconia-titania-silica tergel prepared by the method comprising the steps of:
  (a) mixing a zirconium compound of the formula $M_4Zr(C_2O_4)\cdot nH_2O$ and a titanium compound of the formula $M_2TiO(C_2O_4)_2\cdot nH_2O$, where M is an alkali metal or ammonium ion and n equals 0 to 10, with a silicon compound of the formula $A_2SiO_3$, where A is an alkali metal ion, in an aqueous solution at a pH sufficiently high to avoid precipitation of a tergel;
  (b) adding an acidic material to said solution to lower the pH thereof sufficiently to result in precipitation of a porous hydrotergel containing silica, titania and zirconia and having a pore volume of at least about 1.5 cc/g, said zirconium, titanium and silicon compounds of (a) being mixed in proportions selected to result in respective independent concentrations of said zirconia and titania of between about 0.1 wt. % and 5 wt. % with respect to said silica;
  (c) aging said hydrotergel of (b);
  (d) washing said aged hydrotergel of (c) with a aqueous liquid; and
  (e) removing water from the resulting washed hydrotergel of (d) by a method selected to avoid substantial collapse of the pores of said hydrotergel to produce a xerotergel having a pore volume of at least about 1.5 cc/g.

20. The tergel of claim 19 wherein M is an alkali metal ion.

21. The tergel of claim 19 wherein M is an ammonium ion.

22. The tergel of claim 21 wherein said solution pH of step (a) is at least about 11.

23. The tergel of claim 21 wherein said acidic material of step (b) is added in an amount sufficient to lower said pH to less than about 9.

24. The tergel of claim 19 wherein said acidic material is sulfuric acid, hydrochloric acid or ammonium sulfate.

25. The tergel of claim 19 wherein said aging is done at a temperature between about ambient to 100° C. for at least one hour.

26. The tergel of claim 19 wherein said pore volume is in the range of about 1.5–3.5 cc/g.

27. The method of claim 19 wherein the sum of said zirconia and titania concentrations is less than or equal to about 5 wt. % with respect to silica.

28. The tergel of claim 19 wherein said water is removed from the washed hydrotergel by azeotropic distillation with a compound capable of forming an azeotrope with water.

29. The tergel of claim 19 wherein said water is removed from the washed hydrotergel by washing the hydrotergel with a water miscible solvent or mixture of solvents.

30. The tergel of claim 29 wherein said solvent is a low molecular weight ketone or a mixture of a ketone and a low molecular weight alcohol.

31. The tergel of claim 19 wherein said water is removed from the washed hydrotergel by extracting the hydrotergel with a water miscible solvent or mixture of solvents to remove about 90–95% of the water and then treating the partially dehydrated tergel with a ketal of the formula $RC(OR)_2R$, in which R is the same or different and is an alkyl group of 1–5 carbon atoms, in the presence of a trace of acid, whereby residual water is completely and irreversibly removed.

32. The tergel of claim 19 wherein said water is removed from the washed hydrotergel by contacting the hydrotergel directly with a ketal of the formula $RC(OR)_2R$, where R is the same or different and is an alkyl group of 1–5 carbon atoms, in the presence of a trace of acid, in an amount sufficient to completely and irreversibly react with said water.

33. The tergel of claim 19 wherein said water is removed from the washed hydrotergel by spray-drying.

34. The tergel of claim 19 wherein said water is removed from the washed hydrotergel by freeze drying.

35. The tergel of claim 19 comprising the additional step of calcining said xerotergel of (e).

36. The tergel of claim 35 wherein said calcining is done at a temperature of about 400°–1850° F.

37. An olefin polymerization or copolymerization catalyst prepared by the method comprising the steps of:
  (a) mixing a zirconium compound of the formula $M_4Zr(C_2O_4)\cdot nH_2O$ and a titanium compound of the formula $M_2TiO(C_2O_4)_2\cdot nH_2O$, where M is an alkali metal or ammonium ion and n equals 0 to 10, with a silicon compound of the formula $A_2SiO_3$, where A is an alkali metal ion, in an aqueous solution at a pH sufficiently high to avoid precipitation of a tergel;
  (b) adding an acidic material to said solution to lower the pH thereof sufficiently to result in precipitation of a porous hydrotergel containing silica, titania and zirconia and having a pore volume of at least about 1.5 cc/g, said zirconium, titanium and silicon compounds of (a) being mixed in proportions selected to result in respective independent concentrations of said zirconia and titania of between about 0.1 wt. % and 5 wt. % with respect to said silica;
  (c) aging said hydrotergel of (b);
  (d) washing said aged hydrotergel of (c) with an aqueous liquid;
  (e) removing water from the washed hydrotergel of (d) by a method selected to avoid substantial collapse of the pores of said hydrotergel to produce a xerotergel having a pore volume of at least about 1.5 cc/g;
  (f) calcining said xerotergel of (e);
  (g) introducing a catalytically active compound onto said calcined xerotergel of (f); and,
  (h) activating to produce an active polymerization or copolymerization catalyst.

38. The catalyst of claim 37 wherein M is an alkali metal ion.

39. The catalyst of claim 37 wherein M is an ammonium ion.

40. The catalyst of claim 39 wherein said solution pH of step (a) is at least about 11.

41. The catalyst of claim 40 wherein said acidic material of step (b) is added in an amount sufficient to lower said pH to less than about 9.

42. The catalyst of claim 37 wherein said acidic material is sulfuric acid, hydrochloric acid or ammonium sulfate.

43. The catalyst of claim 37 wherein said aging is done at a temperature between about ambient to 100° C. for at least one hour.

44. The catalyst of claim 37 wherein said pore volume is in the range of about 1.5–3.5 cc/g.

45. The method of claim 37 wherein the sum of said zirconia and titania concentrations is less than or equal to about 5 wt. % with respect to silica.

46. The catalyst of claim 37 wherein said water is removed from the washed hydrotergel by azeotropic distillation with a compound capable of forming an azeotrope with water.

47. The catalyst of claim 37 wherein said water is removed from the washed hydrotergel by washing the hydrotergel with a water miscible solvent or mixture of solvents.

48. The catalyst of claim 47 wherein said solvent is a low molecular weight ketone or a mixture of a ketone and a low molecular weight alcohol.

49. The catalyst of claim 37 wherein said water is removed from the washed hydrotergel by extracting the hydrotergel with a water miscible solvent or mixture of solvents to remove about 90–95% of the water and then treating the partially dehydrated tergel with a ketal of the formula $RC(OR)_2R$, in which R is the same or different and is an alkyl group of 1–5 carbon atoms, in the presence of a trace of acid, whereby residual water is completely and irreversibly removed.

50. The catalyst of claim 37 wherein said water is removed from the washed hydrotergel by contacting the hydrotergel directly with a ketal of the formula $RC(OR)_2R$, when R is the same or different and is an alkyl group of 1–5 carbon atoms, in the presence of a trace of acid, in an amount sufficient to completely and irreversibly react with said water.

51. The catalyst of claim 37 wherein said water is removed from the washed hydrotergel by spray-drying.

52. The catalyst of claim 37 wherein said water is removed from the washed hydrotergel by freeze drying.

53. The catalyst of claim 37 wherein said active compound of (g) is a chromium compound.

54. The catalyst of claim 37 wherein said active compound of (g) is a transition metal compound.

* * * * *

UNITED STATES PATENT AND TRADEMARK OFFICE
CERTIFICATE OF CORRECTION

PATENT NO. : 4,791,089

DATED : December 13, 1988

INVENTOR(S) : Robert A. Dombro, et al.

It is certified that error appears in the above-identified patent and that said Letters Patent is hereby corrected as shown below:

Col. 7, line 60, change "$M_4Zr(C_2O_4).nH_2O$" to --$M_4Zr(C_2O_4)_4.nH_2O$--.

Col. 9, line 8, change "$M_4Zr(C_2O_4).nH_2O$" to --$M_4Zr(C_2O_4)_4.nH_2O$--.

Col. 10, line 24, change "$M_4Zr(C_2O_4).nH_2O$" to --$M_4Zr(C_2O_4)_4.nH_2O$--.

Signed and Sealed this

Thirteenth Day of November, 1990

*Attest:*

HARRY F. MANBECK, JR.

*Attesting Officer*     *Commissioner of Patents and Trademarks*